June 6, 1933. E. F. W. ALEXANDERSON 1,913,148
METHOD AND MEANS FOR INDICATING ALTITUDE FROM AIRCRAFT
Filed April 8, 1929
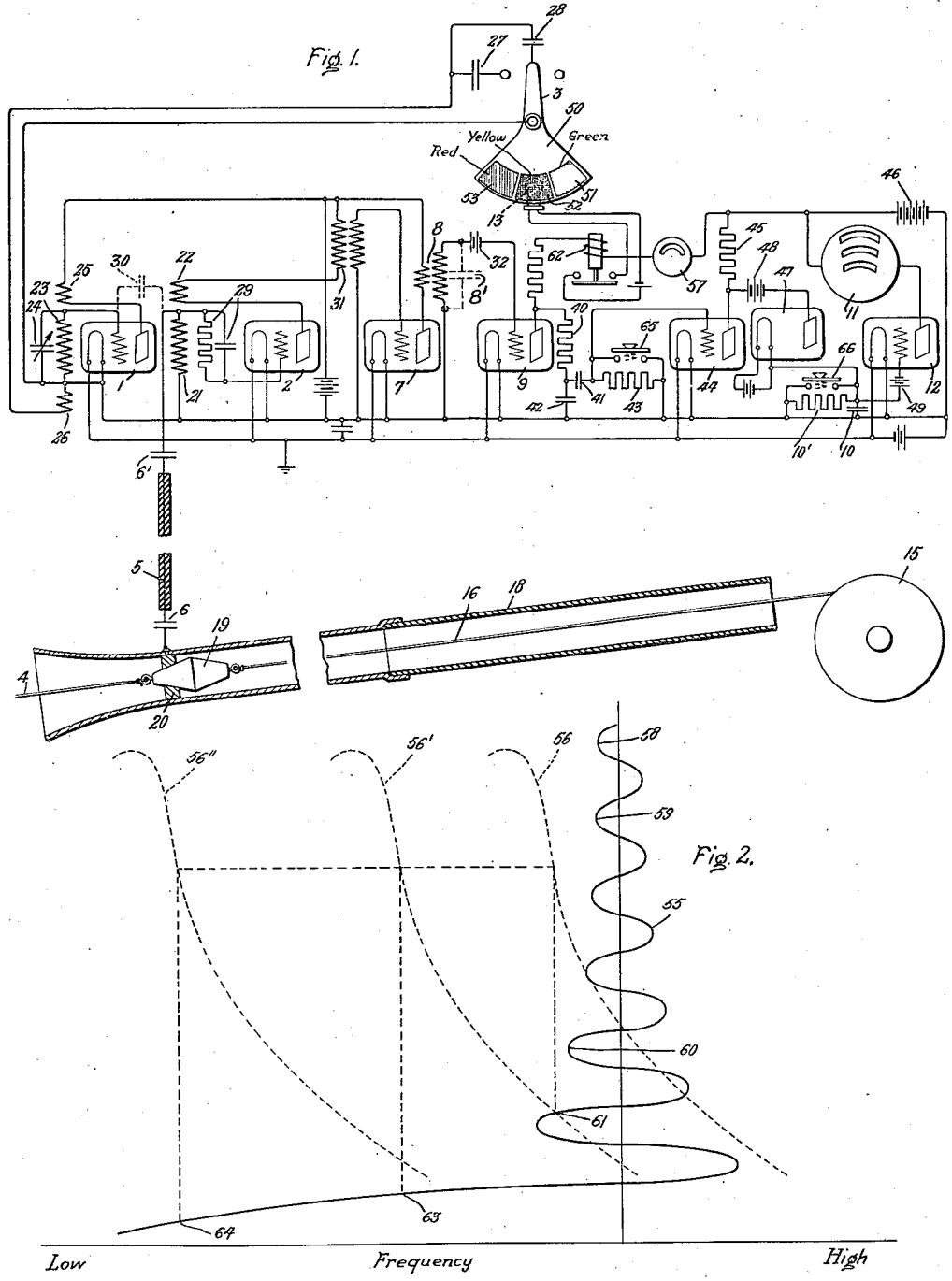
Inventor:
Ernst F. W. Alexanderson
by Charles E. Mullan
His Attorney.

Patented June 6, 1933

1,913,148

UNITED STATES PATENT OFFICE

ERNST F. W. ALEXANDERSON, OF SCHENECTADY, NEW YORK, ASSIGNOR TO GENERAL ELECTRIC COMPANY, A CORPORATION OF NEW YORK

METHOD AND MEANS FOR INDICATING ALTITUDE FROM AIRCRAFT

Application filed April 8, 1929. Serial No. 353,513.

My present application is a continuation in part of my former application, Serial No. 319,989, filed November 17, 1928, entitled Method and means for determining altitude from aircraft and which is assigned to the same assignee as my present application.

My present invention relates to certain improvements in the methods and means for determining altitude from aircraft disclosed in my former application and it has for one of its objects to increase the range of altitudes which may be determined. A further object of the invention is to provide a more accurate and reliable determination of altitude as the plane approaches the earth. Still a further object of the invention is to provide means whereby the operator in making a descent is provided with a continuous indication of altitude which varies in a step by step progressive manner as the craft descends in altitude the steps occurring at definite altitude levels. Still another object of the invention is to provide means operable in the lower altitudes as when the craft is descending to land, or is approaching the earth, as the side of a mountain, whereby one or more positive visual or audible indications may be automatically produced when the craft approaches within certain fairly definite distances from the earth.

The novel features which I believe to be characteristic of my invention are set forth with particularity in the appended claims. My invention itself, however, both as to its organization and method of operation, together with further objects and advantages thereof, may best be understood by reference to the following description taken in connection with the accompanying drawing in which Fig. 1 represents an embodiment of my invention and Fig. 2 represents certain characteristics indicative of the operation thereof.

Referring to Fig. 1 of the drawing, I have shown in the upper portion thereof a pair of electron discharge oscillation generators 1 and 2, the oscillation generator 1 of which is arranged to oscillate at a fixed frequency or at a frequency which may be manually controlled by a suitable frequency control device 3 which is arranged for easy access of the operator. The other oscillation generator 2 is provided with an antenna 4 which is suitably mounted upon or suspended from the craft and which is connected to the circuit of the oscillation generator 2 through a cable connection 5. This oscillation generator is arranged to oscillate at a natural period which is determined by the natural constants of the oscillatory circuit including the antenna and the relation existing between the radiated waves and reflected waves which arrive back at the antenna from the earth. Normally this frequency is somewhat higher than the frequency of oscillations produced by device 1.

As has been fully explained in my above mentioned application, an oscillation generator arranged upon the craft in this manner varies in frequency cyclically as the craft changes in altitude, the amplitude of these cyclic variations being dependent upon the altitude of the craft above the earth.

The beat frequency which is produced between the oscillations of generators 1 and 2 is amplified by an electron discharge device 7 and supplied through a resonance device 8 to the grid of an electron discharge detector 9 whereby a potential is produced which may be utilized in a manner presently to be indicated for controlling the energy stored in a suitable energy storage device. This energy storage device is indicated in the form of a condenser 10. The potential on this condenser is caused to operate an indicating device 11, which is in the form of a current responsive meter, placed in the anode circuit of an electron discharge device 12. An indicating lamp 13 which is provided for purposes later to be described is also controlled in response to potential produced in accordance with the beat frequency.

All of the equipment illustrated in the upper portion of Fig. 1 is located in the cockpit of the craft whereas the antenna 4 preferably is suspended from the fusilage at the rear of the craft. The position of the antenna may be controlled by means of the reel 15 mounted within easy access of the operator. Wound upon reel 15 is a suitable non-conducting cord 16 which extends to the rear of the craft through a suitable conduit 18 to a conducting body 19 to which the inner end of the antenna is attached. Secured within the conduit 18 at the rear portion thereof is a contact member, which is illustrated in the form of a ring 20, which ring is attached to the conductor 5 through a condenser 6. When the antenna is in its outward position the conducting body 19 engages the inner surface of an aperture in the ring 20 thereby making a conductive connection between the oscillator 2 and the antenna 4. By turning the reel 15 clockwise the body 19 may be hauled in through the conduit, thereby to raise the antenna.

The oscillatory circuit of the generator 2 comprises an inductance 21 which is connected between the grid and cathode of the discharge device together with the antenna 4, conductor 5, condensers 6 and 6' and the capacity existing between the craft and the antenna 4. The cable 5 is preferably covered with a conducting shielding material which together with the cathode of device 2 is connected to the frame of the craft, thereby to obviate variations in the frequency of oscillation generator 2 which might otherwise be produced by moving objects upon the craft. The cable is preferably of fairly large dimension in which the conductor is insulated from the sheath by means of a light cotton material thereby to reduce the capacity between the sheath and the cable. It has been found that better operation of the generator may be produced by inserting a condenser in the cable, at the outer end thereof as at 6, this condenser being of size sufficient to neutralize the inductance of the cable. The condenser 6' is of capacity such that it resonates with the inductance 21 at the natural period of the antenna. In this way the conductor which extends through the cable is maintained at a comparatively low potential with respect to the craft and the effect of capacity variations between the antenna and the craft are reduced. The inductance 21 is coupled to the anode circuit of the discharge device by suitable means such as a feedback coil 22.

The oscillatory circuit of the generator 1 comprises an inductance 23 and a condenser 24 connected between the grid and cathode of the discharge device. This circuit is coupled to the anode circuit by means of a feedback coil 25. Inductively coupled to the coil 23 is a coil 26 which may be connected in circuit with either of condensers 27 or 28 which are of different capacity by means of switch 3 thereby to control the frequency of the oscillations produced.

Connected in the grid circuit of the discharge device 2 is the usual grid leak and condenser combination 29 whereby a suitable bias is maintained upon the grid of the device 2 causing this device to have a suitable detecting effect. The two oscillation generators may be coupled together by any suitable means although at the high frequencies employed, which are preferably in the order of 100 meter wave length, the inherent capacity between the circuits has been found to be sufficient. This inherent capacity is indicated at 30.

As thus described, oscillations having frequency equal to the difference in frequency between oscillations produced by generators 1 and 2 will be supplied through the output coil 31 to the grid of amplifier 7. In the anode circuit of this device is connected an output transformer 8 which has an inherent capacity, represented by condenser 8' sufficient to cause it to have a certain natural period of oscillation which is normally somewhat outside of the range of cyclic frequency variations produced, that is, the entire range of variation in the beat frequency when the craft is at high altitude is included in a portion of one side of the peak of the resonance curve. Preferably the side of the resonance curve employed is the one at higher frequency such that an increase in potential results when the frequency decreases. Thus the magnitude of the alternating potential which appears upon the secondary winding of transformer 8 varies substantially proportionately with the frequency which is supplied to this transformer. Of course, the transformer 8 may be replaced by an equivalent resonant circuit.

The alternating potential of the secondary winding of the transformer 8 is in turn supplied to the grid of an electron discharge device 9 which is provided with a grid bias battery 32 whereby the grid is biased negatively to a value such that the device operates principally as a detector or rectifier of the high frequency potential. Between the anode and cathode of the device 9 are connected resistance 40 and condenser 42 through which will pass current impulses dependent upon the variations of the antenna frequency. Accordingly the potential upon condenser 42 will vary with this frequency. This potential is supplied to a resistance 43 through condenser 41. This condenser together with condenser 42 comprises a filter, the purpose of which will later be indicated. The potential upon resistance 43 is supplied to the grid of an electron discharge device 44, the plate circuit of which includes a resistance 45 and battery 46. It will thus be apparent that the current flowing in the resistance 45 will vary dependently upon the potential on resistance 43 and that the direct current potential existing between the cathode and anode of device 44 will correspondingly vary.

Of course, the current flowing in the anode circuit of discharge device 44 may be utilized to indicate the altitude of the craft in the manner described in my above mentioned application. It is desirable, however, to provide means whereby this indication may be made continuous such that the operator of the craft at any time can look at the indicating meter and determine his approximate altitude. In accordance with my present invention, I provide an indicating device 11 together with means whereby said device continuously indicates the altitude at which the maximum variation of frequency was last produced. Thus, for example, as the plane descends from a high altitude and the cyclic variation of current gradually increases in amplitude, the pointer on the meter 11 will move across the scale in a step by step manner each step occurring at a definite altitude level as indicated by the last maximum frequency variation. At intermediate altitudes when the frequency variation is reduced or lies in the opposite half cycle of the frequency variation with reference to the normal value, the meter deflection will be maintained constant thereby continuously indicating the altitude at which the last maximum occurred.

The means whereby this result is effected comprise an energy storage device or condenser 10 which is connected between the grid and cathode of an electron discharge device 12, the anode circuit of which includes the meter 11. The charge on this condenser is determined by the potential between the anode and cathode of discharge device 44. The plate of the condenser opposite to that which is connected to the cathode of discharge device 12 is connected to the cathode of the two element electron discharge device 47, the anode of which is connected through a battery 48 to the anode of discharge device 44. The source of potential 48 is of a value such that with a certain potential between the anode and cathode of discharge device 44 the anode of device 47 will be maintained at a potential which is equal to or slightly negative with respect to the potential of the cathode of device 47. Under this condition no current flows through device 47 and the cathode thereof will be at the potential of the cathode of device 12 with the exception of such charge as may have accumulated on condenser 10. When, due to the variation in frequency of the oscillator 2 the potential between the anode and cathode of device 44 increases, the anode of device 47 becomes positive with respect to the cathode, current will be caused to flow in the circuit including the condenser 10 and the resistance 10' connected in parallel therewith, thereby impressing a negative charge upon said condenser and causing the grid of discharge device 12 to become positive. The grid of this device is biased negatively with respect to the cathode by means of the battery 49 and at a value such that current is normally just prevented from flowing in the anode circuit.

When the charge is impressed upon the condenser 10 this bias is overcome and current will be caused to flow in the anode circuit thereby producing a certain deflection of the meter pointer. Thus during the cyclic variations in the beat frequency which occur when a maximum has occurred a certain charge will be impressed upon the condenser 10 and a certain deflection will be produced by the meter. During the remaining portion of the cycle this deflection of the meter will be retained by the charge upon the condenser. If the amplitude of the next cyclic variation is greater than the last, the charge upon the condenser will be increased and the deflection correspondingly increased. Thus as the craft descends and the amplitude of cyclic variations gradually increase, the meter will be caused to deflect across the scale in a step by step manner, each step occurring at a definite altitude as determined by the maximum in the cyclic variations. This altitude may, of course, be determined in units of wave length.

It will be noticed that the meter 11 is provided with three separate dials. The purpose of this is to increase the range over which the meter may be employed. I have provided means whereby when the needle has exceeded the range of one scale a lamp 13 will be lighted informing the operator that he should change the scale of the meter. To do this, the operator will change the position of the switch 3 thereby changing the frequency of the generator 1. The lower portion of the switch 3 is extended into a fan-shaped member 50 carrying a plurality of colored glass windows 51, 52, and 53, behind which the lamp 13 is located. Thus, as the operator moves the switch, he automatically places a glass window of different color over the lamp.

The operation of these devices may now best be described by reference to Fig. 2 of the drawing. In Fig. 2, curve 55 indicates the frequency of the oscillation generator 2, this characteristic being plotted with altitude as ordinates. It will thus be seen that as the craft descends from a high altitude the cyclic variations in frequency occur with progressively increasing amplitude until the plane reaches a point in close proximity to the earth as within a quarter of the wave length of the oscillations employed. At that time the capacity variation between the antenna and the craft, because of the nearness of the ground, overcomes the variations due to the relation between the reflected and radiated waves and thereby causes a progressive lowering of the frequency as indicated by the lower portion of the curve 55. The curves 56, 56' and 56" each represent the resonance curve of the transformer 8.

Assuming that the switch 3 is in its right-hand position such that the oscillation generator 1 oscillates at a frequency determined by the condenser 24 and inductance 23, the beat frequency between the two generators will be such that the potential variation on the transformer 8 will occur upon the steep portion of the high frequency side of the characteristic 56. This condition may be determined by means of the meter 57 connected in the plate circuit of the device 9.

As the craft descends from a high altitude to a point such as that indicated at 58, a certain charge will be impressed upon the condenser and a certain deflection of the meter will result. This deflection will be retained by the condenser until the craft reaches the point 59 at which time the charge upon the condenser will be increased and the deflection likewise increased. Similarly at each recurring cycle in the descent of the craft the deflection will be increased proportionately with the increase in amplitude of the cyclic variation. If we assume that the altitude represented by the point 60 on the curve 55 is the last point indicated on the upper scale of the meter, the system may be so adjusted that upon the next cyclic variation when the frequency is at a value corresponding to a point 61, and the meter is off scale, the current on the anode circuit of the device 9 will be sufficient to operate a relay 62 thereby causing the lighting of the lamp. This lamp will produce a green indication thereby giving the operator a definite indication of the altitude and informing him that he should change the scale on the meter. He then will move the switch 3 to the position shown in the drawing thereby lowering the frequency of the oscillator 1 and increasing the beat frequency between the two generators. Thus, a larger variation in the frequency of the generator 2 will now be necessary to cause a successive lighting of the light. This operation will occur at a point represented by 63 on the curve since at this point the beat frequency is again at a value such that it produces sufficient current in the anode circuit of device 9 to operate the relay and thereby light the lamp. Since the lamp is now covered by a yellow window the operator is informed of the altitude and that he should again change the dial on the meter. Prior to reaching the point 63, it will be seen that the charge on the condenser was increasing progressively in accordance with the frequency variation and thereby producing an indication of the altitude by means of the second dial. The operator then throws the switch to the left-hand position thereby still further decreasing the frequency of the oscillator 1. This, in turn, causes a still further variation in frequency of the generator 2 before the beat frequency is produced sufficient to cause the lighting of the lamp. The next lighting of the lamp will occur at a point such as 64 on the curve. This indication may if desired be made to occur at a point relatively close to the earth. The red window is now over the lamp thereby giving the operator an indication which may be interpreted as a danger warning due to proximity of the earth.

It will be seen that the lamp may be made to light one or more times in the range of altitudes when the cyclic variations occur as at the point 61 and that each of these indications constitutes a definite determination of altitude. Thus, it will be seen that the lamp will not be lighted when the craft is at the altitude indicated by the point 60 since the variation will not be sufficiently great. At the same time the craft cannot reach a lower altitude than that indicated at the poin 61 without lighting the light. Thus, the altitude at which the light is energized is very definitely fixed by the form of the curve at 61. Similarly, the altitude of the points 63 and 64 are fixed although at these points the variation is due principally to capacity between the antenna and the craft. It will be seen that these lamps offer positive indication that the craft is approaching the earth.

During the ascent of the craft, to make observations of altitude, the operator will first press keys 65 and 66 thereby discharging condensers 41, 42, and 10, and he will then release the keys and change his altitude through a half of a wave length of the radiated wave, thereby causing a maximum of variation to be produced. The meter will then indicate the altitude at this point and this indication will be retained during the remainder of the ascent or until the keys 65 and 66 are again pressed as for the purpose of making a second observation.

It may occur during the operation of the device as thus described, that the normal frequency of one or both of the oscillation generators will vary during the course of a flight, as, for example, due to variation in the anode or filament potential of the discharge devices. Variations of this nature will, of course, cause a shift in the beat frequency of the oscillation generators. To obviate inaccuracies in the reading of the instrument which are likely to occur for this reason the filter comprising condensers 41 and 42 is employed. The condenser 41 is of a capacity such that it passes all frequencies greater than some low value, for example, 1/30th of a cycle per second. The condenser 42 is of somewhat smaller value and is adapted to bi-pass all frequencies greater than, for example, one cycle per second. In this way the gradual shift in potential upon condenser 42 which occurs, due to the gradual drift of the beat frequency, is prevented from affecting the reading of the meter 11, all of which has been fully described in my above-mentioned co-pending application.

It is further important in the operation of my device as thus described that the detector 9 be one of the grid bias type, as indicated, rather than of the grid leak type, since the indications can then be made in response to increasing current in the indicating circuits rather than decreasing currents. This not only reduces the drain upon the batteries but enables the deflection of meter 11 to be made with reference to a low or zero value of current which is comparatively easy to maintain whereas this deflection would otherwise be with reference to a comparatively high value of current which is subject to variation due to various causes which are somewhat difficult to control.

Similarly by using a transformer 8 at the point at which it is employed in the circuit the cathodes of all of the discharge devices except device 46 may be energized from the same source 10 and if desired the anodes may be similarly energized from the same source.

While I have shown a particular embodiment of my invention, it will, of course, be understood that I do not wish to be limited thereto since various modifications may be made both in the circuit arrangement and the instrumentalities employed and I, therefore, intend to cover in the appended claims any such modifications as fall within the true scope and spirit of my invention.

What I claim as new and desire to secure by Letters Patent of the United States, is:—

1. The method of determining the altitude of aircraft above the earth which comprises radiating a high frequency wave from the craft, causing the frequency of said wave to vary cyclically as the craft varies in altitude the amplitude of the cyclic variation being dependent upon the altitude and producing a continuous indication dependent upon the amplitude of the maximum variation last produced.

2. The method of determining the altitude of aircraft by means of an antenna circuit arranged to oscillate at a wave length determined by inherent constants of the circuit and the relation between the radiated and reflected waves whereby said oscillations vary cyclically with respect to a certain value in the higher range of altitudes and progressively in the lower range, which includes producing an indication in the higher range dependent upon the amplitude of the cyclic variation and producing an additional indication dependent upon the magnitude of the progressive variations from said certain value in the lower range of altitudes.

3. The method of determining the altitude of aircraft above the earth by means of an antenna circuit arranged to oscillate at wave lengths determined by inherent constants of the circuit and the relation between the radiated and reflected waves whereby said oscillations vary cyclically with progressively increasing amplitudes as the craft varies in altitude which includes producing an indication dependent upon the maximum amplitude of the cyclic variations last produced and producing at least one additional indication when the variations in frequency exceed predetermined values.

4. An altitude measuring device for aircraft comprising an antenna circuit arranged to oscillate normally at a frequency determined by the inherent constants of the circuit whereby the frequency of oscillations produced varies cyclically as the craft changes in altitude, the amplitude of said cyclic variations varying dependently upon the altitude, an energy storage device, means for producing an indication dependent upon the energy stored in said device, and means for supplying energy to said device dependent upon the amplitude of the frequency variation.

5. An altitude measuring device for aircraft comprising an antenna circuit arranged to oscillate normally at a frequency determined by the inherent constants of the circuit whereby the frequency of oscillations produced varies cyclically with reference to a certain mean value as the craft changes in altitude, the amplitude of said cyclic variation varying dependently upon the altitude, an energy storage device, means for producing an indication dependent upon the energy stored in said device, and means for increasing the energy stored in said device in response to successive increases in the magnitude of said cyclic variation and for retaining the energy stored in said device when said variation from the mean value is reduced below a value corresponding to the last maximum.

6. An altitude measuring device for aircraft comprising an antenna circuit arranged to oscillate normally at a frequency determined by the inherent constants of the circuit whereby the frequency of oscillations produced varies cyclically as the craft changes in altitude, the amplitude of said cyclic variations varying dependently upon the altitude, means for producing an electromotive force variable dependently upon said frequency variation, an energy storage device, means for producing an indication dependent upon the energy stored in said device, and means for increasing the energy stored in said device in response to successive increases in the magnitude of said electromotive force and for retaining the energy stored in said device when said electromotive force is reduced below a value corresponding to the last maximum.

7. An altitude measuring device for aircraft, comprising an antenna circuit arranged to oscillate normally at a frequency determined by the inherent constants of the circuit whereby the frequency of oscillation in said antenna varies cyclically as the craft changes in altitude, means for producing an electromotive force variable in magnitude dependently upon the frequency of said oscillations, a condenser and an asymmetrically conducting device connected in series across said means thereby to cause energy to be stored in said condenser in response to successive increases in said electromotive force and to prevent discharge of said condenser, and indicating means responsive to the charge on said condenser.

8. The method of determining the altitude of aircraft above the earth which includes producing oscillations which vary in frequency dependently upon the altitude of the craft, causing said oscillations to beat with oscillations of fixed frequency, producing an indication when the beat frequency has a predetermined value and varying the frequency of the oscillations of fixed frequency thereby to cause a beat frequency of said predetermined value to be produced at different altitudes.

9. The method of determining the altitude of aircraft above the earth which includes producing oscillations which vary in frequency with respect to a normal value dependently upon the altitude of the craft above the earth, causing said oscillations to beat with oscillations having frequency of a fixed value different from said normal value, producing an indication when the beat frequency has a predetermined value and increasing the difference between said normal and fixed values of frequency thereby to cause said indication to be produced at different altitudes.

10. The combination, in an altitude indicating device for aircraft, an antenna arranged to oscillate at a natural period whereby oscillations are produced in said antenna which vary in frequency with reference to a normal value as the craft changes in altitude, means for producing oscillations of fixed frequency lower than said normal value, means for producing an indication when the difference in the frequency of oscillations produced by said antenna and said last means is a predetermined value, and means for changing the frequency of one of said oscillation producing means thereby to cause said indication to be produced at different altitudes.

11. The combination, in an altitude indicating device for aircraft, an antenna arranged to oscillate at a natural period whereby oscillations are produced in said antenna which vary in frequency with reference to a normal value as the craft changes in altitude, means for producing oscillations of fixed frequency lower than said normal value, a resonant circuit, means for supplying oscillations to said circuit having frequency dependent upon the difference between the frequency of oscillations in said antenna and said fixed frequency said circuit being so adjusted that the frequency supplied thereto lies in the steep portion of the voltage frequency characteristic, and means for manually increasing the beat frequency whereby a greater variation in frequency of oscillations in the antenna is required to cause said beat frequency to lie in the steep portion of said characteristic, and indicating means responsive to voltage on said circuit.

12. The combination, in an altitude indicating device for aircraft, a pair of oscillation generators arranged to operate at different frequencies, the frequency of oscillations produced by one of said generators being variable dependently upon the altitude of the craft from the earth, means for producing a predetermined indication dependent upon the difference in frequency between oscillations produced by said generators, means for varying the frequency of one of said generators by predetermined amounts thereby to vary the altitude at which said indications occur and additional means controlled by said last means whereby said indications may be distinguished with respect to altitude.

13. The combination, in an altitude indicating device for aircraft, an indicating device having a deflectable member, and a dial, and means for causing said member to deflect in a step by step manner across said dial in response to the change in altitude of the craft, each step occurring at a definite altitude level.

14. The combination in an altitude indicating device for aircraft, a pair of oscillation generators one of said generators including a radiating oscillatory circuit arranged to oscillate at a natural period and the other generator being arranged to oscillate at a fixed period, an indicating means having a plurality of scales each corresponding to a certain range of altitudes and a pointer cooperating with said scales, means for causing said pointer to deflect in response to the difference in frequency between oscillations produced by said generators, and means for changing the frequency of one of said generators whereby said altitude is determined from a different scale.

15. The combination in an altitude indicating device for aircraft, a pair of oscillation generators one of said generators including a radiating oscillatory circuit arranged to oscillate at a natural period and the other generator being arranged to oscillate at a fixed period, an indicating means having a plurality of scales each corresponding to a certain range of altitudes and a pointer cooperating with said scales, means for causing said pointer to deflect in response to the difference in frequency between oscillations produced by said generators, and means for changing the frequency of one of said generators whereby said altitude is determined from a different scale, and additional means for indicating when the range of one of said scales has been exceeded.

16. The combination, in an altitude indicating device for aircraft a pair of oscillation generators, one of said generators including a radiating oscillatory circuit arranged to oscillate at a natural period, and the other generator being arranged to oscillate at a fixed period, an indicating lamp, means for lighting said lamp in response to the difference in frequency between oscillations produced by said generators, means associated with the circuit of one of said generators and variable in position to control the frequency thereof, and means controlled by said last means to characterize the indication produced by said lamp in accordance with the frequency of said last mentioned generator.

17. The method of utilizing a self-excited oscillation generator on aircraft to determine altitude, which includes radiating oscillations from said generator toward the earth and receiving the reflected wave back upon said oscillation generator whereby a characteristic of the radiated wave varies progressively in the lower range of altitudes and cyclically in the higher range of altitudes, and utilizing a frequency determining constant of the oscillator in said lower range of altitudes different from the frequency determining constant utilized in the higher range of altitudes.

18. The method of utilizing a self-excited oscillation generator on aircraft to determine altitude which includes radiating oscillations from said generator toward the earth and receiving the reflected wave back upon said oscillation generator whereby a characteristic of the radiated wave varies progressively in the lower range of altitudes and cyclically in the higher range and utilizing a different frequency determining constant of said oscillation generator after said variation exceeds certain predetermined values.

19. The method of determining the altitude of aircraft above the earth which includes radiating a high frequency wave from the craft toward the earth, causing the wave which is reflected back from the earth to produce cyclic variations in a characteristic of the radiated wave with respect to changes in altitude and producing a continuous indication dependent upon the amplitude of the cyclic variation last produced.

20. The method of utilizing a self-excited oscillation generator on aircraft to determine altitude, which includes radiating oscillations from said generator toward the earth, supplying the reflected wave received from the earth to said generator in such a way as to cause cyclic variations in a characteristic of the radiated wave as the craft changes in altitude and producing a continuous indication dependent upon the amplitude of the maximum variation last produced.

In witness whereof, I have hereunto set my hand this 6th day of April, 1929.

ERNST F. W. ALEXANDERSON.